United States Patent [19]

Hasegawa et al.

[11] Patent Number: 5,122,817

[45] Date of Patent: Jun. 16, 1992

[54] ELECTROPHOTOGRAPHIC RECORDER USING A MODULATED LASER BEAM TO SCAN THE ORIGINAL

[76] Inventors: Hirofumi Hasegawa; Naoto Ohmori; Yukio Yamada; Narutaka Yoshida, all of 3-13, 2-Chome, Azuchi-Machi, Chuo-Ku, Osaka-Shi, Osaka, 541, Japan

[21] Appl. No.: 750,729

[22] Filed: Aug. 20, 1991

Related U.S. Application Data

[63] Continuation of Ser. No. 374,261, Jun. 29, 1989, Pat. No. 4,921,422.

[30] Foreign Application Priority Data

Jun. 29, 1988 [JP] Japan ............... 63-162214

[51] Int. Cl.$^5$ ............................... H04N 1/21
[52] U.S. Cl. .................... 346/108; 355/202; 358/296
[58] Field of Search .......... 346/1.1, 108, 107 R, 346/160, 76 L; 355/200, 202; 358/296, 300, 302

[56] References Cited

U.S. PATENT DOCUMENTS

| | | | |
|---|---|---|---|
| 3,966,319 | 6/1976 | Lang | 355/66 |
| 4,012,585 | 3/1977 | Chen | 346/108 |
| 4,169,275 | 9/1979 | Gunning | 358/300 |
| 4,397,537 | 8/1983 | Tamura | 355/202 |
| 4,571,064 | 2/1986 | Hayashi et al. | 355/243 |
| 4,917,483 | 4/1990 | Nakao | 350/423 |

FOREIGN PATENT DOCUMENTS

| | | |
|---|---|---|
| 54-25736 | 1/1979 | Japan . |
| 54-130137 | 10/1979 | Japan . |
| 56-23953 | 3/1981 | Japan . |
| 61-19033 | 5/1986 | Japan . |

*Primary Examiner*—Mark J. Reinhart

[57] ABSTRACT

An image forming apparatus comprising a laser beam radiating unit utilized as a light source, and an optical system that the surface of an original reflects a laser beam radiated from the radiating unit to project an image reflected from the original onto a photosensitive member. In this apparatus, an image is formed selectively in a print mode so that an image results from turning on and off the laser beam, in a copy mode that a copy of an original results from exposure of the photosensitive member to the laser beam reflected from the surface of an original or in a composite mode that a composite image is formed of a copy of an original and an image resulting from turning on and off the laser beam. Further, this apparatus comprises a projection lens unit for projecting an image reflected from an original onto the photosensitive member. The laser beam transmitting through the lens unit is scanned in the direction perpendicular to the main scanning direction, and altering the scanning speed and position of the lens unit results in various magnifications of an image.

8 Claims, 3 Drawing Sheets

ELECTROPHOTOGRAPHIC RECORDER USING A
MODULATED LASER BEAM TO SCAN THE
ORIGINAL

This is a continuation of application Ser. No. 374,261, filed on Jun. 29, 1989, for a IMAGE FORMING APPARATUS WITH USE OF A LASER BEAM now U.S. Pat. No. 4,921,422.

BACKGROUND OF THE INVENTION

1. Field of the Invention

The present invention relates to an image forming apparatus, and more specifically, an image forming apparatus wherein a photosensitive member charged with a specified potential beforehand is exposed to a laser beam responding to image data so that an electrostatic latent image is formed on the photosensitive member, and then the latent image becomes visible on a sheet of paper.

2. Description of Related Art

Generally, regarding an image forming apparatus wherein an electrostatic latent image on a photosensitive member is caused by exposure to light with image data, and then the latent image appears on a paper sheet, an electrophotographic copier wherein a copy of an original results from reflection and a laser printer wherein a laser beam is turned on and off in accordance with image data are known. These apparatuses are different from each other only in measure of exposure, and the other elements of an image forming section except a light source can be commonly used in the apparatuses.

Therefore, Japanese Laid Open Patent Publication No. 54-25736 suggests an image forming apparatus for which exposure means utilizing the reflection of an original and exposure means utilizing a modulated laser beam are both provided, wherein the other image forming elements are commonly used. This arrangement enables an image to be formed selectively by the reflected light from an original or the modulated laser beam.

In this apparatus, however, it is impossible to form a composite image by using both the reflected light from an original and the laser beam simultaneously. For, in this apparatus, the light to be reflected by the surface of an original and the laser beam are emitted from different light sources, and their optical paths are different except for the last portion of them.

SUMMARY OF THE INVENTION

It is, therefore, an object of the present invention to provide an image forming apparatus wherein not only the reproduction of an original and the image forming with use of a modulated laser beam can be separately performed and simultaneously performed to make a composite image of them but also an image can be formed arbitrarily magnified.

Another object of the present invention is to provide an image forming apparatus wherein the sub-scanning (in the direction perpendicular to the main scanning direction) of the laser beam on an original is performed in a movable optical system, bringing about a speed-up in forming an image.

Another object of the present invention is to provide an image forming apparatus equipped with a compact optical system by placing a light splitting device in the middle of a path of the laser beam to a photosensitive member.

To attain the above-mentioned objects, an image forming apparatus according to the present invention is an apparatus wherein an electrostatic latent image is formed on a photosensitive member charged with specified potential, the photosensitive member being exposed to light from a light source, and the latent image is developed and then transferred onto a sheet of paper. The image forming apparatus comprises a laser beam radiating unit; a projection lens unit for projecting an image reflected from an original onto the photosensitive member; scanning means for scanning the laser beam reflected from the surface of an original relative to the projection lens unit in the sub-scanning direction; drive means for moving the projection lens unit along its optical axis; and means for varying the magnification in forming an image by controlling at least the drive means.

Accordingly, when the laser beam radiating unit is kept on so that the surface of the original keeps on reflecting the laser beam, the image of the original is projected onto the photosensitive member, thereby reproducing the image of the original. Also, when the laser beam radiating unit is turned on and off to radiate the laser beam in accordance with image data with the reflecting surface white, an image is formed only in response to turning on and off the laser beam. Further, when an original is set on the original glass, and at the same time the laser beam radiating unit is turned on and off in accordance with image data, a composite image is formed of a copy of the original and an image resulting from turning on and off the laser beam. A magnified or a reduced image can be formed on a paper sheet by having at least the projection lens unit shifting its position along its optical axis. Thereby, a magnification ratio in the direction of the main scanning by a beam scanning device in the laser beam radiating unit is altered. As far as the alteration of a magnification ratio in the sub scanning direction is concerned, when an image is to be formed with a modulated laser beam it is accomplished by altering the rotation frequency of the beam scanning device and the modulation frequency of the laser beam. In order to alter a copying magnification ratio, the laser beam reflected from the surface of an original placed on an original glass is scanned at various speeds. As means of scanning the laser beam in the sub-scanning direction, three ways of scanning exist: a way that an optical system is moved, a way that an original glass is moved and a way that an original is moved with an optical system and an original glass fixed. Of the three ways above, the way that an optical system is moved is preferable from a viewpoint of a speed-up in scanning, that is, a speed-up in forming an image.

Further, the image forming apparatus according to the present invention comprises not only the components as mentioned above but also a light splitting device in the middle of a path of the laser beam.

Accordingly, the laser beam radiated from a radiant element is reflected on a reflecting portion of the light splitting device, to be scanned in the main scanning direction by the beam scanning device, and the reflected laser beam irradiates an original. The light reflected from the surface of an original is received by the light splitting device through the same optical path and directed to the projection lens unit to be projected onto the photosensitive member. Thus, a latent image is formed on the photosensitive member. Using the light splitting device makes an optical path common to the laser beam irradiating an original and the laser beam reflected from the surface of the original, thereby contributing to a compactness of the optical system.

BRIEF DESCRIPTION OF THE DRAWINGS

These and other objects and features of the present invention will become apparent from the following description taken in conjunction with the preferred embodiment thereof with reference to the accompanying drawings.

DESCRIPTION OF THE PREFERRED EMBODIMENT

A preferred embodiment of an image forming apparatus according to the present invention is described below in reference to the accompanying drawings.

Figure 1:
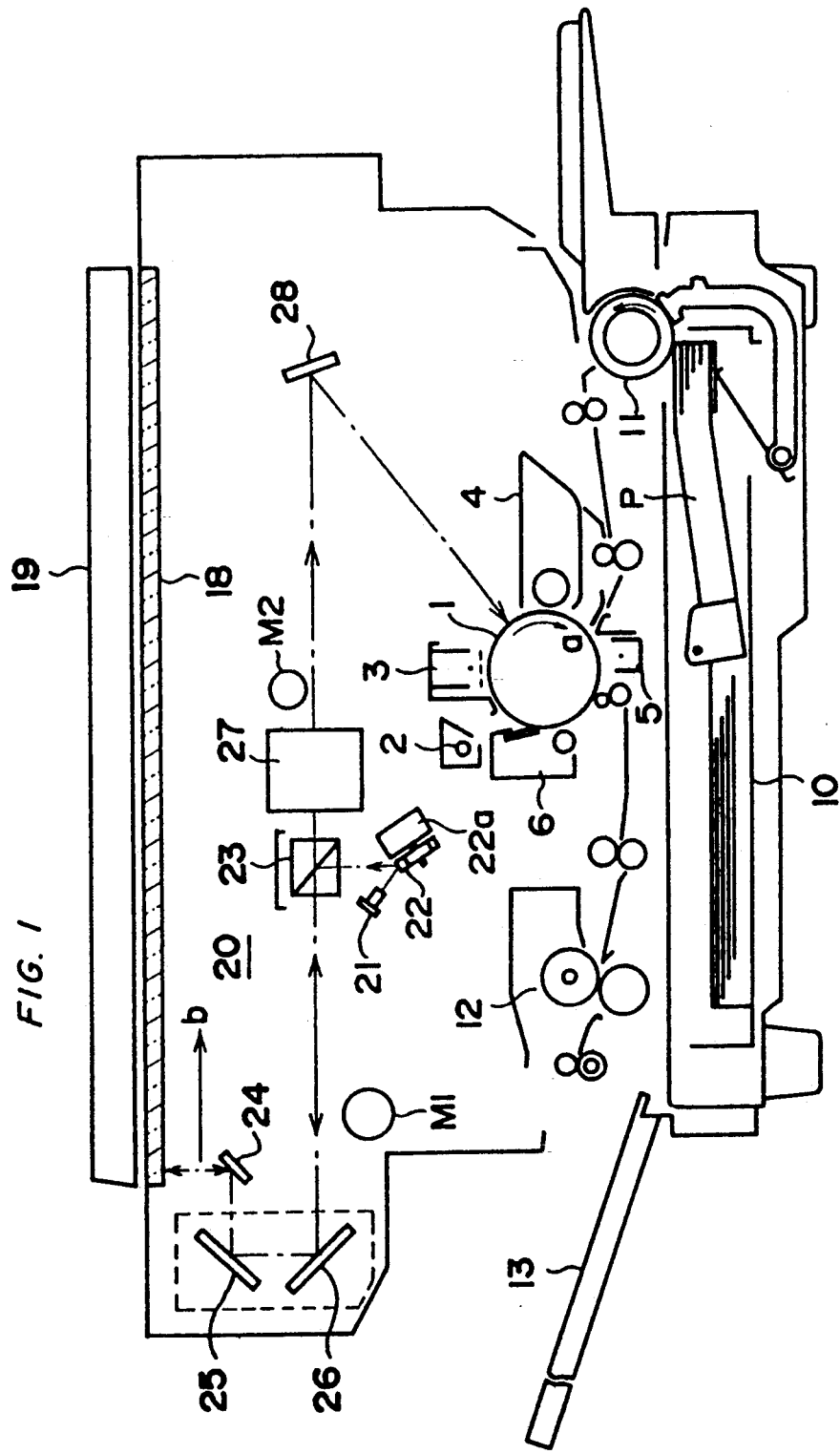
FIG. 1 is a schematic view showing a general constitution of an image forming apparatus according to the present invention.

As shown in FIG. 1, a photosensitive drum 1 is arranged in the center of a main body of an apparatus and can be driven to rotate in the direction of the arrow a. Around the photosensitive drum 1, an eraser lamp 2 for removing residual charge, an electric charger 3, a developing device 4 taking a magnetic brush way, a transfer charger 5, a cleaning device 6 for removing residual toner with a blade, etc. are arranged.

Copying paper is fed sheet by sheet from a feeding cassette 10 which is removable and disposed at the lower part of the body of the apparatus. A sheet fed from the cassette 10 makes a U-turn around a feeding roller 11, and when the sheet passes between the photosensitive drum 10 and the transfer charger 5, a toner image is transferred thereon. Thereafter, the toner image is fixed on the sheet by a fixing device 12, and the sheet is discharged onto a tray 13.

An original glass 18 is fixed on the upper surface of the body, and an original cover 19 which can be open and closed is provided for the original glass 18 on its upper surface. Under the original glass 18, an optical system 20 is disposed. The optical system 20 comprises a laser diode 21, a polygon mirror 22 for scanning a laser beam in the main scanning direction, a beam splitter 23, a first mirror 24, a second mirror 25, a third mirror 26, a projection lens unit 27 and a fourth mirror 28. The first mirror 24 is movable in the direction of the arrow b at a speed of v/m (v: peripheral speed of the photosensitive drum, m: magnification ratio). The second mirror 25 and the third mirror 26 are unified and movable in the direction of the arrow b at a speed of v/2 m.

The mirrors 24, 25 and 26 are driven by a stepping motor M1. The projection lens unit 27 is capable of shifting its position along its optical axis in accordance with a copying magnification ratio, and this shifting operation is executed by a stepping motor M2.

The laser beam radiated from the laser diode 21 is scanned by the polygon mirror 22 which is driven to rotate by a motor 22a, and the laser beam is reflected by the beam splitter 23 to be directed to the third mirror 26. Then, the laser beam is reflected by the second mirror 25 and the first mirror 24 and irradiates an original or the reverse side of the original cover 19. The laser beam reflected from the surface of an original or the reverse side of the original cover 19 reverses along the same optical path that is, the first mirror 24, the second mirror 25, the third mirror 26 and the beam splitter 23. Then, the laser beam which is transmitted through the beam splitter 23 is guided to the projection lens unit 27 and projected onto the photosensitive drum 1 via the fourth mirror 28. The laser diode 21 is controlled to be turned on and off by a drive circuit in response to an image signal produced by an image control section of a computer. The polygon mirror 22 is driven to rotate at a specified frequency. Such a control system of the image signal is so well-known that the detailed description is omitted.

The process of forming an image on a sheet of copying paper in the above-described constitution is hereinafter described.

Figure 2:
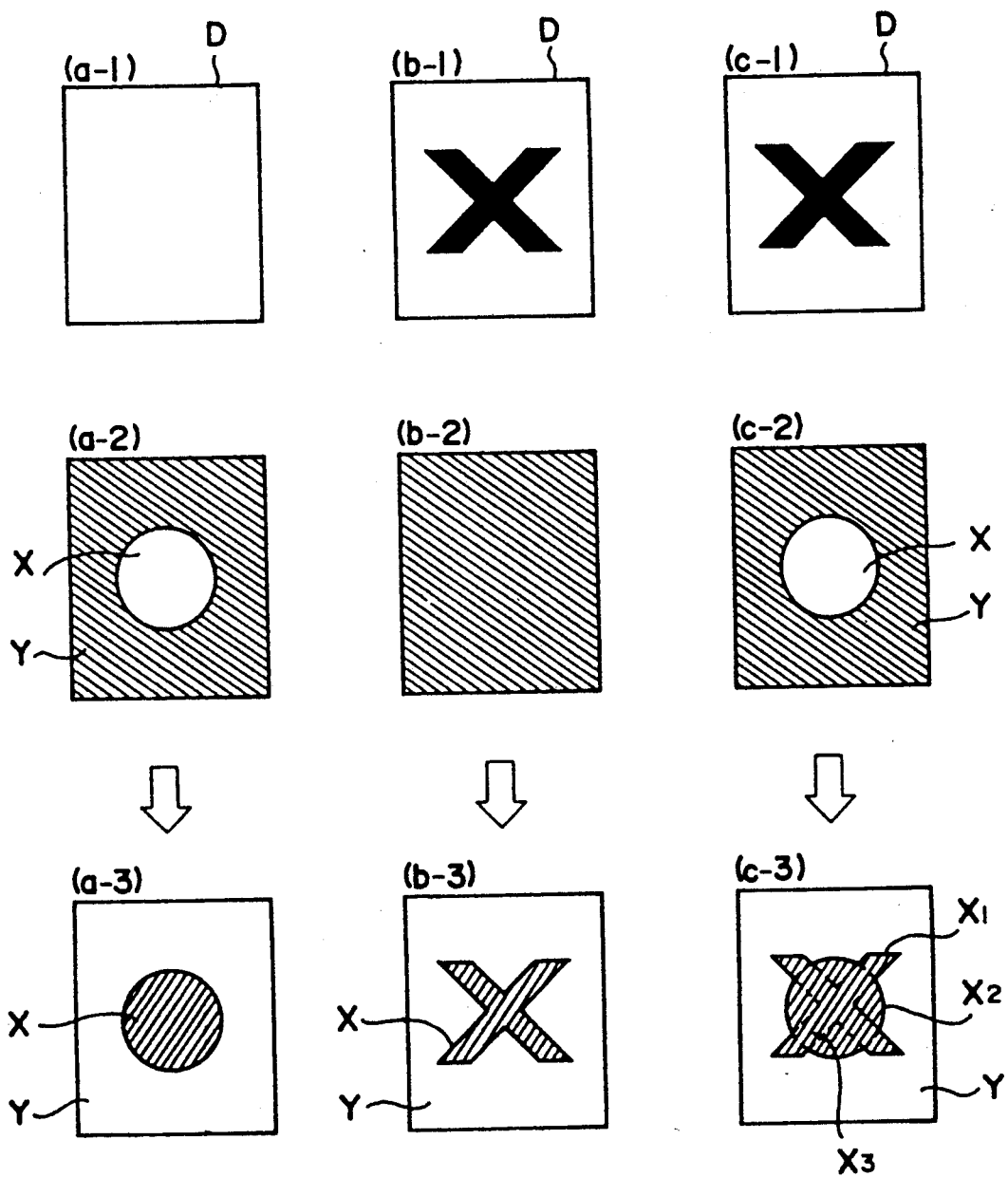
FIG. 2 is a view explaining the relations among the surface of an original, an output from a laser diode and a latent image.

First, in a case of printing an image with the modulated laser beam, as shown by FIG. 2, (a-1), a white blank sheet D should be placed on the original glass 18 as a reflecting surface, or the reverse side of the original cover 19 should be used as a reflecting surface, and then image data is output from the laser diode 21. For example, referring to FIG. 2, (a-2), the laser diode 2. is kept off while an imaged portion X in the shape of a circle is scanned, and the laser diode 21 is kept on while a background Y shown by oblique lines in the drawing is scanned. Thereby, as shown by FIG. 2, (a-3), an electrostatic latent image is formed on the photosensitive drum 1 of the imaged portion X maintaining electric charge and the background Y where electric charge was erased. Additionally, it is not necessary to move the mirrors 24, 25 and 26.

Also, in order to print out a copy of an original, the original should be placed on the original glass 18, the laser diode 21 should be kept on all the time, and the mirrors 24, 25 and 26 should be moved at a specified speed. For example, when the laser diode 21 keeps on emitting the laser beam [FIG. 2, (b-2)] to an original D as shown by FIG. 2, (b-1), an electrostatic latent image is formed on the photosensitive drum 1 of an imaged portion X maintaining electric charge and a background Y where the electric charge was erased, as shown by FIG. 2, (b-3).

Further, in a case of printing out a composite image of a copy of an original and an image resulting from turning on and off the laser beam, an original D should be placed on the original glass 18, and the mirrors 24, 25 and 26 should be moved at a specified speed, and at the same time the laser diode 21 should be turned on and off to output image data. For example. the laser diode 21 radiates the laser beam to an original D as shown by FIG. 2, (c-1), being off while an imaged portion X in the shape of a circle shown by FIG. 2, (c-2) is scanned and being on while a background Y as shown by oblique lines in the drawing is scanned. Thereby, a composite electrostatic latent image is formed of two images as shown by FIG. 2, (c-3). In this case, the portion shown by X1, which was exposed to the laser beam, remains charged because it corresponds to an imaged portion of the original D. The portion shown by X2, which corresponds to a background of the original D, remains charged because it was not exposed to the laser beam. The portion shown by X3 remains charged because it corresponds to an imaged portion of the original D and was not exposed to the laser beam. In the other portion Y, the charge is erased, and the portion Y becomes a background.

The diameter of the laser beam which irradiates the surface of an original needs to be narrow enough in order to reproduce the image of an original well. Unless the diameter of the laser beam is narrow enough, the laser beam will be apt to irradiate both white and black portions of an original at a time, and the scattering coefficient of the reflection on the surface of the original will be large, resulting in poor image reproduction.

Figure 3:
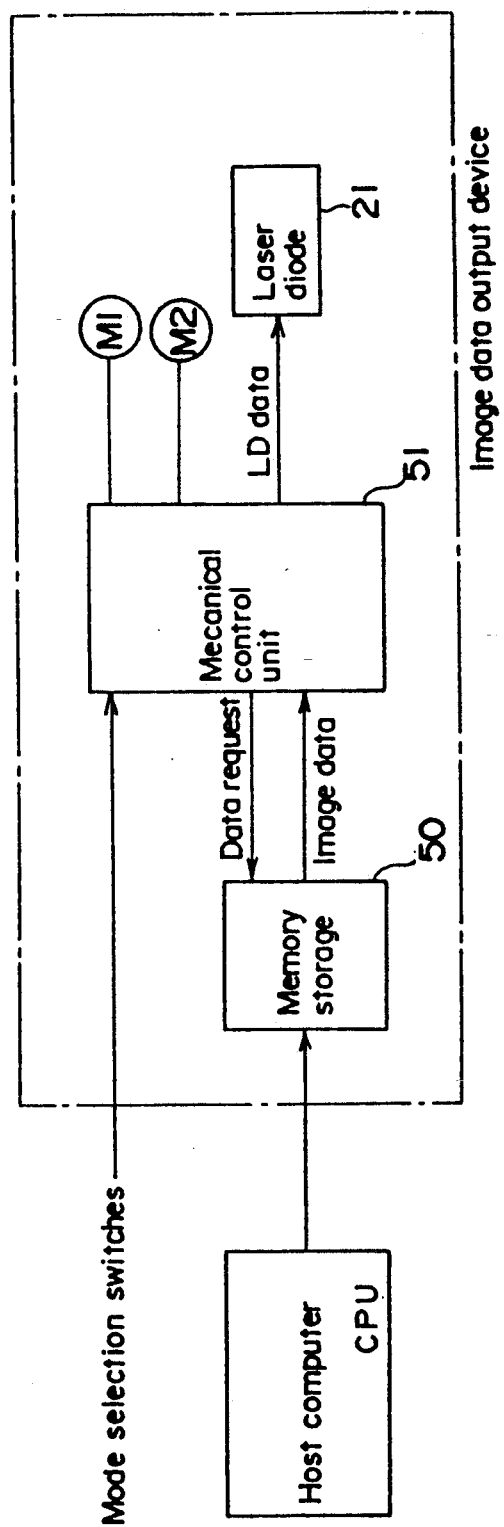
FIG. 3 is a block diagram showing a control circuitry.

The apparatus is controlled by an image data output device (refer to FIG. 3). A memory storage 50 outputs image data in response to a data requiring signal from a mechanical control unit 51, and the laser diode 21 is controlled in accordance with the image data. The mechanical control unit 51 also controls the stepping motor M1 for moving the mirrors 24, 25 and 26 and the stepping motor M2 for adjusting the position of the lens unit 27.

A copy mode selection switch, a print mode selection switch and a composite mode selection switch are provided on a control panel (not shown) of the body, and each mode is selected when a corresponding switch is turned on. Signals produced from these switches are input into the mechanical control unit 51 so that the mechanism control section 51 can perform necessary control.

Further, in the above-described apparatus, a magnification ratio in forming an image can be easily varied because the optical system is a moving type.

When magnifying or reducing an original, the same as the image forming with use of conventional visible radiation, the projection lens unit 27 should be moved left in FIG. 1 when magnifying the original and right in FIG. 1 when reducing the original. Besides, the scanning speeds of the mirrors 24, 25 and 26 should be changed in accordance with the magnification ratio. That is, if the magnification ratio is "m", and the peripheral speed of the photosensitive drum 1 is fixed at "v", the first mirror 24 should be moved at a speed of v/m, and the second mirror 25 and the third mirror 26 should be moved at a speed of v/2 m.

When magnifying or reducing an image resulting from a modulated laser beam, the rotation frequency of the polygon mirror 22 and the modulation frequency of the laser beam are changed in accordance with the magnification ratio so that the image can be magnified or reduced in the sub-scanning direction. The magnification or the reduction of the image in the main scanning direction is accomplished by moving the projection lens unit 27 left or right in FIG. 1 as described above. Further, the travel speeds of the mirrors 24, 25 and 26 do not relate to the magnifying and reducing operation in the print mode, so that the mirrors 24, 25 and 26 may be stationarily positioned.

For example, when magnifying an image to be formed with a modulated laser beam by x times, the rotation frequency of the polygon mirror 22 should be changed into 1/x times which is the inverse number of the magnification ratio, and the modulation frequency of the laser beam should be changed into 1/x times likewise. Since the projection lens unit 27 works to modify or reduce an image in the main scanning direction, the rotation frequency of the polygon mirror 22 and the modulation frequency of the laser beam need to be in proportion to each other at all times. More specifically, in the apparatus wherein an image of the same size as an original is formed with 300 dpi (dot/inch), with the rotation frequency of the polygon mirror 7500 rpm and the modulation frequency of the laser beam 3.8 MHz, when magnifying an image by twice, the rotation frequency of the polygon mirror should be changed into 3750 rpm, and the modulation frequency of the laser beam should be changed into 1.9 MHz.

When magnifying or reducing a composite image, the travel speeds of the mirrors 24, 25 and 26 are adjusted in accordance with the magnification ratio, in addition to the above operation for magnifying or reducing an image resulting from a modulated laser beam.

Although the beam splitter 23 is used as a light splitting device in this embodiment, it is possible to utilize other devices such as a half mirror.

Further, in this embodiment, as means of scanning the image of an original, the optical system moving in the sub-scanning direction has been adopted, but an original glass can be so made to be movable or an original moving type can be adopted. Furthermore, as a photosensitive member, not only one on which an electrostatic latent image is formed but also can a silver salt film be used.

Although the present invention has been described in connection with the preferred embodiment thereof, it is to be noted that various changes and modifications are apparent to those who are skilled in the art. Such changes and modifications are to be understood as included within the scope of the present invention as defined by the appended claims, unless they depart therefrom.

What is claimed is:

1. An image forming apparatus, comprising:
   an original glass for supporting an original;
   a rotatable photosensitive member;
   a laser beam radiating unit including a radiant element for radiating a laser beam and a beam scanning device for scanning the laser beam in a first direction;
   control means for modulating the laser beam in accordance with image data;
   optical means for guiding the laser beam radiated from said laser radiating unit to the original glass and for producing a reflected image from the original;
   means for varying the magnification of the reflected image in a second direction perpendicular to the first direction including: scanning means for scanning the reflected image from a surface of the original in the second direction perpendicular to the first direction, said scanning means being capable of varying magnification of the reflected image in the second direction; means for varying a scanning frequency of the beam scanning device; and means for varying a modulating frequency of the modulating control means; and
   means for varying the magnification of the reflected image in the first direction including a projection lens unit for projecting the image reflected from the original onto said photosensitive member, said projection lens unit being movable along its optical axis; and drive means for varying magnification of the reflected image in the first direction by moving said projection lens unit along its optical axis.

2. An image forming apparatus as claimed in claim 1, wherein said scanning means includes:
   a first reflecting member which is movable along said original glass;

a second reflecting member which is movable in the same direction as said first reflecting member at a half speed of said first reflecting member; and second drive means for driving said first and second reflecting members.

3. An image forming apparatus as claimed in claim 2, further comprising a light splitting device for guiding the laser beam radiated from said laser beam radiating unit to said second reflecting member and guiding the reflected laser beam therefrom to said projection lens unit.

4. An image forming apparatus as claimed in claim 2, wherein said drive means further controls said second drive means.

5. An image forming apparatus, comprising:
   an original glass for supporting an original;
   a rotatable photosensitive member;
   a laser beam radiating unit including a radiant element for radiating a laser beam and a beam scanning device for scanning the laser beam in a first direction;
   control means for modulating the laser beam in accordance with image data;
   optical means for guiding the laser beam radiated from said laser radiating unit to the original glass and for producing a reflected image from the original;
   scanning means for scanning the reflected image from a surface of the original in a second direction perpendicular to the first direction of said laser beam, said scanning means including a plurality of reflecting members movable along said original glass;
   means for varying the magnification of the reflected image in a second direction perpendicular to the first direction including: changing means for changing the moving speed of said plurality of reflecting members to vary the magnification of the reflected image in the second direction; means for varying a scanning frequency of the beam scanning device; and means for varying a modulating frequency of the modulating control means; and
   means for varying the magnification of the reflected image in the first direction including a projection lens unit for projecting the image reflected from the original onto said photosensitive member, said projection lens unit being movable along its optical axis; and drive means for varying magnification of the reflected image in the first direction by moving said projection lens unit along its optical axis.

6. An image forming apparatus, comprising:
   an original glass for supporting an original;
   a rotatable photosensitive member;
   a laser beam radiating unit including a radiant element for radiating a laser beam and a rotatable reflecting means for scanning the laser beam in a first direction;
   control means for modulating the laser beam in accordance with image data;
   optical means for guiding the laser beam radiated from said laser radiating unit to the original glass and for producing a reflected image of the image data from the original glass;
   scanning means for scanning the reflected image in a second direction perpendicular to the first direction;
   a projecting lens unit for projecting the image reflected from the original glass onto said photosensitive member, said projecting lens unit having components movable along its optical axis;
   means for varying the magnification of the reflected image in the first direction including drive means for moving the components of said projecting lens unit; and
   means for varying the magnification of the reflected image in the second direction including: changing means for changing the rotation speed of said rotatable reflecting means; means for varying a modulating frequency of said modulating control means; and means for varying a scanning speed of said scanning means.

7. An image forming apparatus as claimed in claim 6, wherein said drive means further controls the scanning speed of said scanning means.

8. An image forming apparatus having a copying and printing capability, comprising:
   means for generating a laser beam;
   means, responsive to the impact of a laser beam, for recording an image realized by the laser beam, including a recording member having a surface responsive to the laser beam,
   first means for scanning the laser beam in a first direction across the surface of the original and after reflection therefrom across the recording means;
   means for supporting an original for a copying mode of operation;
   second means for scanning the laser beam in a second direction substantially perpendicular to the first direction across the surface of the original and after reflection therefrom across the recording means to provide a copy image for the recording means;
   means, within an optical path between the generating means and the supporting means, for splitting the direction of the laser beam;
   means for varying the magnification of the reflected image in the first direction including: a projection lens unit for projecting the copy image reflected from the original onto the recording means, the projection lens unit being movable along its optical axis; and drive means for varying magnification of the reflected image in the first direction by moving said projection lens unit along its optical path;
   means for varying the magnification of the reflected image in the second direction including: means for varying a scanning frequency of the first means for scanning; means for varying a modulating frequency of the modulating control means; and means for varying a scanning speed of said second means for scanning; and
   means for providing paper for both a printing and copying mode of operation to receive and fix the copy image information on the recording member, and
   control means, responsive to an operator, for selecting one of a copy mode and a print mode for directing a specific mode of operation of the laser beam.

* * * * *

UNITED STATES PATENT AND TRADEMARK OFFICE
CERTIFICATE OF CORRECTION

PATENT NO. : 5,122,817
DATED : June 16, 1992
INVENTOR(S) : Hirofumi Hasegawa et al It is certified that error appears in the above-indentified patent and that said Letters Patent is hereby corrected as shown below:

On the title page, after item [76] Inventors: insert the following:

--[73] Assignee: Minolta Camera Kabushiki Kaisha--.

On the title page, item [63] should read as follows:

--Continuation of Ser. No. 374,261, June 29, 1989, [Pat. No. 4,921,422] now abandoned.--.

Signed and Sealed this

Twenty-first Day of December, 1993

Attest:

BRUCE LEHMAN

*Attesting Officer*  *Commissioner of Patents and Trademarks*